(12) United States Patent
Reynolds et al.

(10) Patent No.: US 8,919,892 B2
(45) Date of Patent: Dec. 30, 2014

(54) BRAKE PIPE VENT VALVE FOR LOCOMOTIVE BRAKE SYSTEM

(75) Inventors: John M. Reynolds, Carthage, NY (US);
Scott Margeson, Watertown, NY (US);
Derick Call, Evans Mill, NY (US);
Howard E. Huber, Jr., Black River, NY (US); Steven R. Newton, Adams, NY (US)

(73) Assignee: New York Air Brake Corporation, Watertown, NY (US)

( * ) Notice: Subject to any disclaimer, the term of this patent is extended or adjusted under 35 U.S.C. 154(b) by 1065 days.

(21) Appl. No.: 11/937,229

(22) Filed: Nov. 8, 2007

(65) Prior Publication Data

US 2009/0121539 A1  May 14, 2009

(51) Int. Cl.
*B60T 17/04*  (2006.01)

(52) U.S. Cl.
USPC .................................................. 303/82

(58) Field of Classification Search
CPC ...... B60T 13/665; B60T 17/228; B60T 15/42
USPC ........................... 303/3, 15, 20, 82
See application file for complete search history.

(56) References Cited

U.S. PATENT DOCUMENTS

| | | | | | |
|---|---|---|---|---|---|
| 1,756,922 | A | * | 4/1930 | Ives | 303/3 |
| 2,165,999 | A | * | 7/1939 | Farmer | 303/15 |
| 3,240,535 | A | * | 3/1966 | Jeffrey | 303/15 |
| 4,014,580 | A | * | 3/1977 | Bridigum | 303/82 |
| 4,026,609 | A | * | 5/1977 | Bridigum | 303/82 |
| 4,974,911 | A | * | 12/1990 | Hart | 303/82 |
| 5,096,266 | A | * | 3/1992 | Skantar | 303/82 |
| 5,172,316 | A | | 12/1992 | Root et al. | |
| 5,501,513 | A | * | 3/1996 | Gayfer | 303/73 |
| 6,036,284 | A | | 3/2000 | Pettit et al. | |
| 6,238,010 | B1 | | 5/2001 | Barber et al. | |
| 6,318,811 | B1 | | 11/2001 | Root et al. | |
| 6,318,812 | B1 | * | 11/2001 | Newton et al. | 303/82 |
| 6,474,748 | B1 | * | 11/2002 | Cunkelman | 303/81 |
| 6,964,456 | B2 | | 11/2005 | Root | |

* cited by examiner

*Primary Examiner* — Nguyen Xuan Lan
(74) *Attorney, Agent, or Firm* — David L. Nocilly; Bond Schoeneck & King, PLLC

(57) ABSTRACT

The dual vent valve includes a housing having brake pipe, emergency input and exhaust ports, and first and second valves. The emergency output port is fluidly connected to the emergency input port. The first valve selectively connects the brake pipe port to the exhaust port by opening the first valve in response to an emergency signal on the brake pipe port. The second valve selectively connects the brake pipe port to the exhaust port by opening the second valve in response to an emergency signal on the emergency input port.

6 Claims, 3 Drawing Sheets

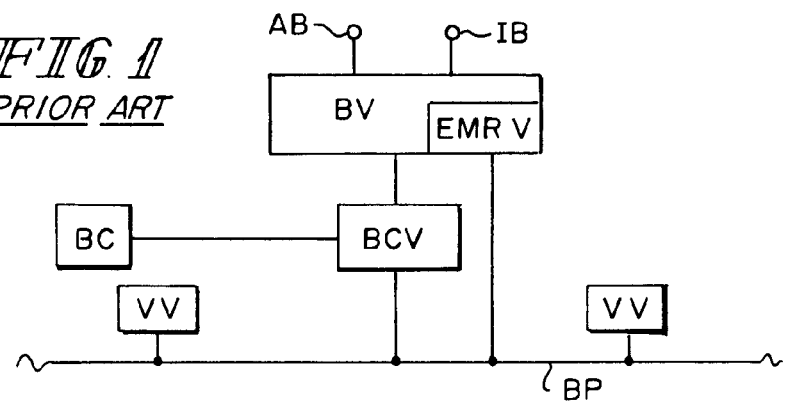
FIG. 1 PRIOR ART
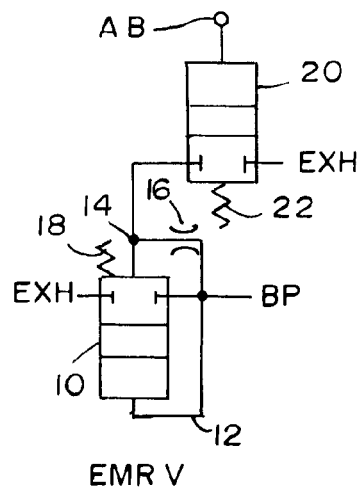
PRIOR ART FIG. 2
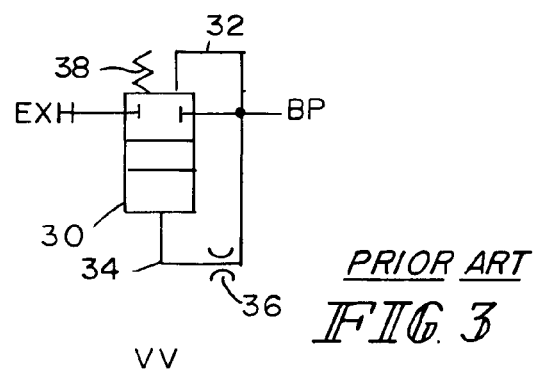
PRIOR ART FIG. 3
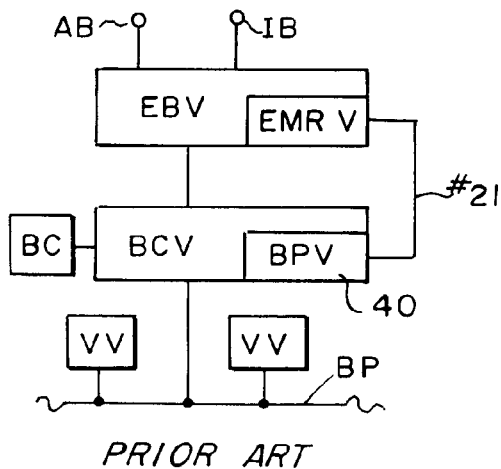
PRIOR ART FIG. 4
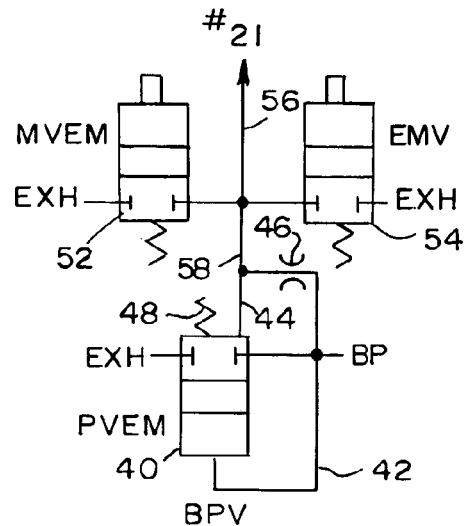
PRIOR ART FIG. 5

BRAKE PIPE VENT VALVE FOR LOCOMOTIVE BRAKE SYSTEM

BACKGROUND AND SUMMARY

The present disclosure relates to locomotive brake systems and more specifically to a brake pipe vent valve for locomotive brake systems.

A locomotive brake system generally includes a brake valve with brake handles, e.g., an automatic brake handle and an independent brake handle to provide control signals to a brake control valve. The brake control valve controls the brake cylinder and the brake pipe. The brake control valve provides service brake, emergency brake, and release brake signals on the brake pipe. Connected at each end of the locomotive are vent valves which are responsive to an emergency condition in the brake pipe to exhaust the brake pipe and accelerate the transmission of the emergency signal. The brake valve includes an emergency valve which is responsive to the emergency position of the automatic brake handle to also vent the brake pipe. In some systems this is connected directly to the brake pipe or it is connected to the brake control valve to vent the brake pipe. The brake control valves may include a brake pipe vent valve which is responsive to electric signals from the brake valve or other safety valves, e.g., dead man's switch or various penalties to also vent the brake pipe in response to unsafe conditions. The vent valve is only responsive to an emergency condition in the brake pipe. The discussion of the prior art systems will be described with respect to FIGS. 1 through 5.

The present locomotive brake system includes a brake controller operable by an operator, a brake valve and a brake pipe vent valve. The brake controller includes an emergency output port which provides an operator emergency pneumatic signal on the emergency output port when the brake controller is in an emergency position. The brake valve is responsive to brake signals from the brake controller for generating brake signals on a brake pipe.

The dual vent valve includes a housing having brake pipe, emergency input and exhaust ports, a first valve, and a second valve. The emergency output port is fluidly connected to the emergency input port and the brake pipe port is connected to the brake pipe. The first valve selectively connects the brake pipe port to the exhaust port by opening the first valve in response to an emergency signal on the brake pipe port. The second valve selectively connects the brake pipe port to the exhaust port by opening the second valve in response to the operator emergency signal on the emergency input port.

The first valve opens in response to a greater pressure in a first volume (comprising a second, opposing chamber of the first valve), which is connected to a second volume (comprising a first chamber of the first valve) by a choke, than pressure in the second volume, which is connected to the brake pipe port. The second valve opens in response to a smaller pressure in a third volume (comprising a second, opposing chamber of the second valve), which is connected to the emergency input port, than pressure in a fourth volume (comprising a first chamber of the second valve), which is connected to the brake pipe port.

The first valve opens in response to the second valve being open and also in response to the emergency pressure in the brake pipe. The second valve opens only in response to the operator emergency signal on the emergency input port.

These and other aspects of the present disclosure will become apparent from the following detailed description of the disclosure, when considered in conjunction with accompanying drawings.

BRIEF DESCRIPTION OF DRAWINGS

FIG. 1 is a schematic of a locomotive brake system of the prior art as provided by U.S. Pat. No. 5,172,316.

FIG. 2 is a schematic of the emergency valve EMRV of FIG. 1.

FIG. 3 is a schematic of the vent valve of FIG. 1.

FIG. 4 is a schematic of a locomotive brake system of the prior art as exemplified by U.S. Pat. No. 6,036,284.

FIG. 5 is a schematic of the brake pipe valve of FIG. 4.

DETAILED DESCRIPTION OF THE PREFERRED EMBODIMENTS

Figure 6:
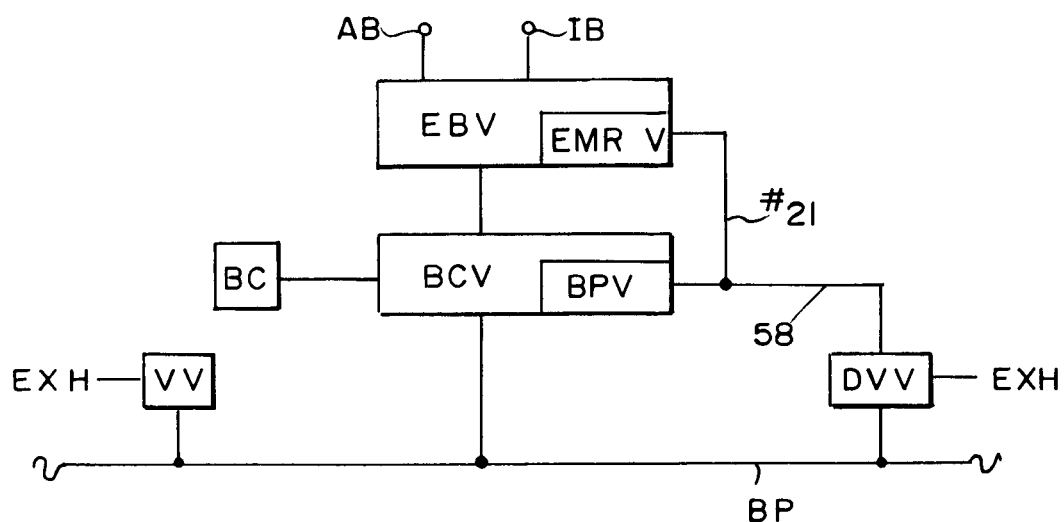
FIG. 6 is a schematic of a locomotive brake system according to the present disclosure.

One of the brake control systems of the prior art is illustrated in FIGS. 1 through 3. The brake valve BV includes an automatic brake handle AB and an independent brake handle IB. It also includes an emergency valve EMRV which is responsive to the emergency position of the automatic brake handle AB to connect the brake pipe BP to exhaust. This propagates an emergency brake signal or emergency rate of depletion of the brake pipe throughout the train. The brake valve BV provides control signals through the brake control valve BCV which controls the brake cylinder BC on the locomotive as well as providing service brake signals, emergency brake signals and release brake signals onto the brake pipe BP. At each end of the train is a vent valve VV which is responsive to emergency brake pipe pressure in the brake pipe to connect the brake to exhaust to more quickly deplete the brake pipe and therefore accelerate the brake pipe signal. A complete description is found in U.S. Pat. No. 5,172,316.

The emergency vent valve EMRV of FIG. 1 is illustrated in FIG. 2 as including a valve 10 having a chamber 12 connected to a brake pipe BP directly. An opposed chamber 14 is connected to the brake pipe BP via choke 16. A spring 18 in combination with the pressure in chamber 14 keeps the valve 10 in the block position against the pressure in chamber 12. Once the brake pipe is stabilized and chamber 14 is fully charged, fluctuation of the brake pipe does not affect the position of the EMRV. A valve 20, which is also connected to chamber 14, includes a spring 22 biasing it in its closed position. The automatic brake handle AB, when moved into the emergency position, moves the valve 20 down to connect the chamber 14 to exhaust. This causes the valve 10 to move to its second position connecting the brake pipe BP to exhaust EXH. This propagates a brake signal directly from the brake valve BV down the brake pipe. The automatic brake handle AB may be connected through cams to the valve 20 or it may be an electropneumatic valve controlled from an electrical sensor to sense the emergency position of the automatic brake valve AB.

A vent valve VV of the prior art is illustrated in FIG. 3. The valve 30 includes a chamber 32 connected directly to the brake pipe BP and an opposing chamber 34 connected to the brake pipe BP via choke 36. A spring 38 in combination with the pressure in chamber 32 biases the valve 30 to the closed position shown. Once the system is stable and the brake pipe charges the chamber 34, the valve 30 is stable. Upon a drop in pressure in the brake pipe at an emergency rate, chamber 32 is depleted while chamber 34 maintains substantially as charged. This moves the valve 30 to the second or open position, which connects the brake pipe BP to exhaust EXH. This accelerates the exhausting of the brake pipe which accelerates the emergency signal down the brake pipe.

A later version of the locomotive brake system is illustrated in FIGS. 4 and 5. The brake control valve BCV includes a brake pipe valve BPV. The emergency valve EMRV of the electronic brake valve EBV is connected via a line known as #21 to the brake pipe valve BPV in the brake control valve BCV. The brake pipe valve BPV vents the brake pipe in response to the emergency position of the automatic brake handle AB as well as to other safety systems. A complete description is found in U.S. Pat. No. 6,036,284. The modification of the brake pipe valve BPV is illustrated in FIG. 5. Valve 40 has a first chamber 42 connected directly to brake pipe BP and a second opposed chamber 44 connected to brake pipe BP by choke 46. A spring 48 biases the valve 40 to the shown position cutting off the brake pipe BP. Once the system is stabilized and the brake pipe BP has charged chamber 44, the valve 40 is maintained in the position shown. Fluctuations in the pressure of the brake pipe BP do not cause the valve 40 to change its position.

Valve 40 is also known as the PVEM in the described patent. Chamber 44 is also connected to a magnetic valve MVEM 52 and a magnetic emergency valve EMV 54 via emergency input pilot port 58. These are under control of the electronic brake valve EBV or other systems within the locomotive. When the electropneumatic valves 52,54 are actuated, they move from the position shown to their second position which connects chamber 44 to exhaust EXH. This causes the PVEM valve 40 to move from the position shown to a second position connecting brake pipe BP to exhaust EXH. Chamber 44 is also connected at port 58 by 56 to the #21 pipe which is connected to the EMRV valve in the EBV as well as to other safety valves within the locomotive. This will also connect chamber 44 to exhaust causing the PVEM valve 40 to move to the position where the brake pipe BP is connected to exhaust EXH. As previously discussed, the PVEM valve 40 is responsive to the signal on port 58 and is not responsive to brake pipe which is only used to charge the chambers 42 and 44.

The dual vent valve of the present disclosure in a brake system is illustrated in FIG. 6. The system, including an electric brake valve EBV connected to the brake control valve BCV directly and via emergency valve EMRV with pipe #21 is connected to the brake pipe valve BPV. The brake control valve BCV is connected to brake pipe BP as well a brake cylinder BC. The elements just discussed are the same as that of the prior art of FIG. 4. The major difference is that the present system includes a dual vent valve DVV which is also connected to the #21 pipe and emergency pilot port 58. The DVV is responsive to an emergency reduction of brake pipe pressure in the brake pipe BP as well as the emergency signal on port 58. The dual vent valve DVV has a housing which has a brake pipe, emergency input and an exhaust port input ports. As will be shown with respect to FIG. 7, it has a first valve which selectively connects the brake pipe port to the exhaust port by opening the first valve in response to emergency signal on the brake pipe. It also includes a second valve which selectively connects the brake pipe port to the exhaust port by opening the second valve in response to an operator emergency signal on the emergency input pilot port 58.

Figure 7:
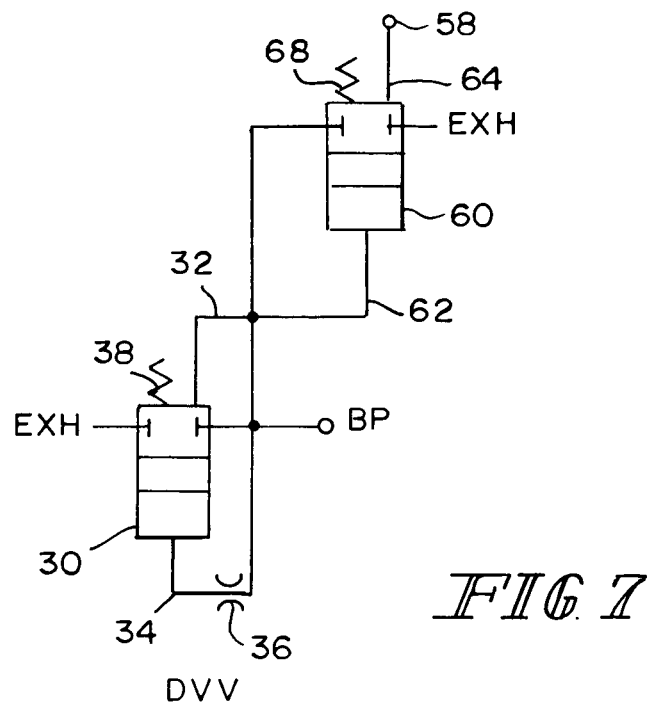
FIG. 7 is a schematic of a vent valve according to the present disclosure.

A detailed structure is illustrated in FIG. 7. The vent valve 30 is the same vent valve structure as that in FIG. 3 of the prior art. The brake pipe port BP is connected to the first chamber 32 directly and to the second opposing chamber 34 through choke 36. The spring 38 biases the valve 30 to its closed position as illustrated. In addition, there is a second valve 60 also connected to the brake pipe port BP and having a first chamber 62 connected directly to the brake pipe port BP and an opposing second chamber 64 connected to the emergency signal #21 from the electronic brake valve EBV and the emergency input pilot port 58. A spring 68 biases the valve 60 to the closed position shown.

As previously discussed, the #21 pipe is pressurized during normal conditions and during an emergency position of the automatic brake valve AB the pressure in the #21 pipe goes to zero. Thus, when the automatic brake handle AB is in the emergency position, port 58 and chamber 64 (comprising the third volume) is exhausted and the brake pipe pressure in chamber 62 (comprising the fourth volume) forces the valve to its second position connecting the brake pipe BP to exhaust EXH. Activation of valves MVEM 52 and EMV 54 will also connect port 58 and chamber 64 to exhaust EXH. When the brake pipe is connected to exhaust, it also reduces the pressure in chamber 32 causing the vent valve 30 to assume its open position also connecting brake pipe BP to exhaust EXH. This parallel connection of the brake pipe to exhaust through the two open valves increases the capacity and therefore, further accelerates the depletion of the pressure in the brake pipe accelerating the emergency signal down the brake pipe. The capacity of valve 60 may be equal to the capacity of valve 30 or may be smaller.

The valve 60 is not responsive to the pressure in the brake pipe and is maintained in the closed position as long as there is pressure in chamber 64 indicating that the automatic brake valve AB is not in the emergency position and neither of emergency valves MVEM 52 and EMV 54 are activated. Thus the valve 30 is responsive to both an emergency signal on the brake pipe as well as the opening of the valve 60 to exhaust whereas the valve 60 is only responsive to the emergency signal on port 58 from the electronic brake valve EBV and brake pipe valve BPV.

Figure 8:
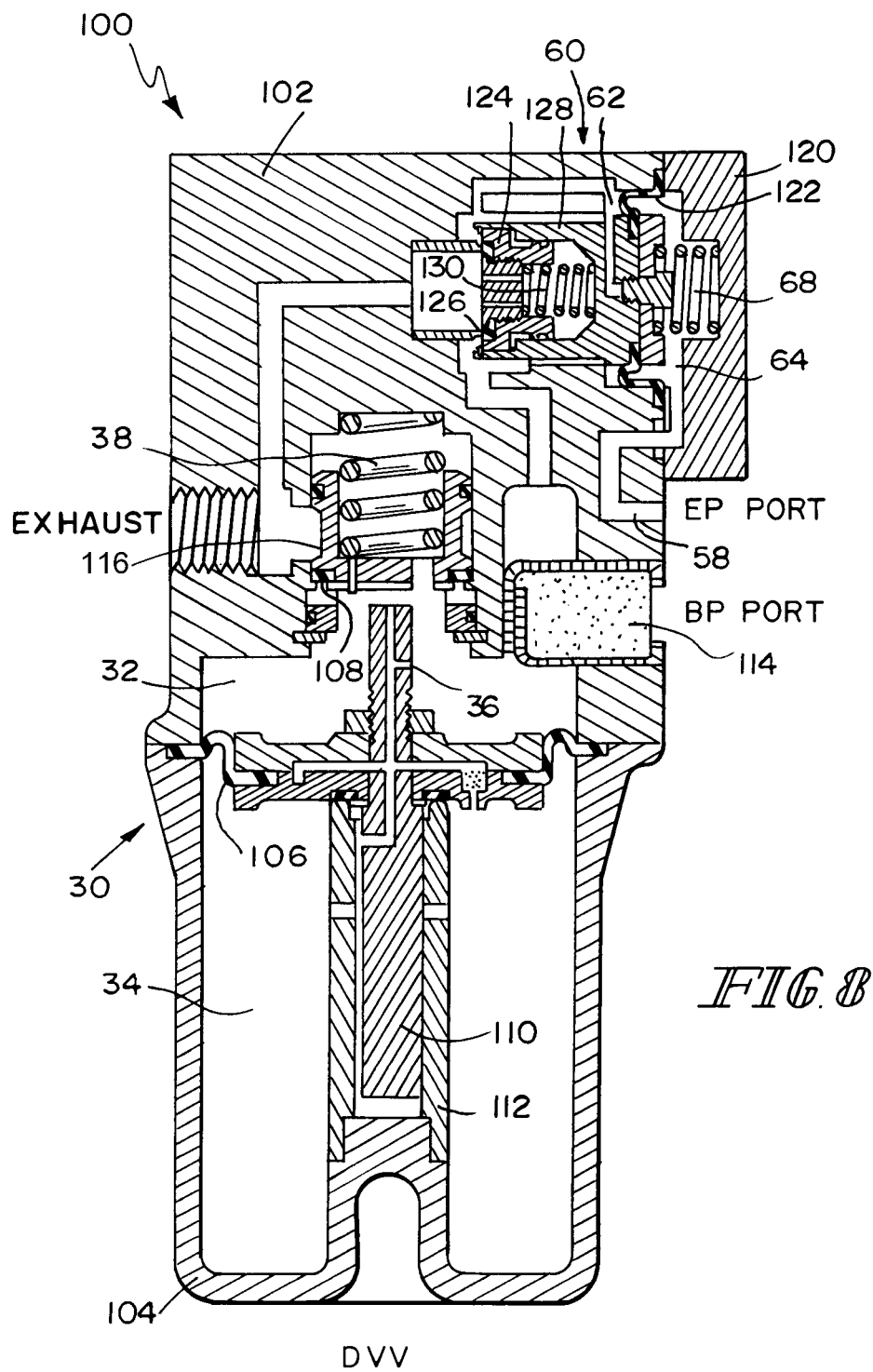
FIG. 8 is a cross-sectional view of an embodiment of a vent valve of the present disclosure.

An embodiment or implementation of the dual vent valve DDV is illustrated in FIG. 8. The housing 100 includes a main body portion 102 having a canister 104 attached thereto. The canister secures a diaphragm piston 106, spring 38, valve element 116. Valve seat 108 is provided in a bore of the main housing portion 102. The diaphragm piston 106 is secured between housing portions 102 and 104. A stem 110 of the diaphragm piston 106 is received in sleeve 112 which acts as a stop for the diaphragm piston 106. The choke 36 is an internal passage in the stem 110. Diaphragm piston 106 divides chamber 32 and 34 of valve 30.

The brake pipe port BP is connected through filter 114 to chamber 32 of valve 30. It is also connected to chamber 62 of the valve 60. The emergency input pilot port EP 58 is connected to chamber 64 of valve 60. Body portion 120 maintains spring 68, diaphragm piston 122, spring 130 and valve element 124 in the main housing portion 102. The diaphragm piston 122 is secured between the housing portions 102 and 120. The valve element 124 rests on valve seat 126. Spring 130 provides a loss motion between stem 128 of the piston and the valve element 124.

As can be seen, chamber 32 is responsive to a drop of pressure in the brake pipe port BP or from opening of valve 60. Valve 60 is only responsive to a drop in pressure at the emergency pilot port 58. FIG. 8 is only one example of a combined dual vent valve of the present disclosure.

Although the present disclosure had been described and illustrated in detail, it is to be clearly understood that this is done by way of illustration and example only and is not to be taken by way of limitation. The scope of the present disclosure is to be limited only by the terms of the appended claims.

What is claimed:

1. A locomotive brake system comprising:
    a brake controller operable by an operator to generate brake signals and including an emergency output port which provides an operator emergency pneumatic signal on the emergency output port when the brake controller is in an emergency position;
    a brake valve responsive to brake signals from the brake controller for generating brake signals on a brake pipe;
    a brake pipe vent valve including
        a housing having brake pipe, emergency input and exhaust ports,
        a first valve that connects the brake pipe port to the exhaust port and opens in response to a greater pressure in a first volume than pressure in a second volume connected to the brake pipe port, the first and second volumes being connected by a choke and
        a second valve that connects the brake pipe port to the exhaust port and opens in response to a smaller pressure in a third volume connected to the emergency input port than pressure in a fourth volume connected to the brake pipe port; and
    the emergency output port on the brake controller being fluidly connected to the emergency input port of the brake pipe vent valve;
    wherein the first valve opens in response to the second valve being open and also in response to an emergency pressure in the brake pipe.

2. A locomotive brake system comprising:
    a brake controller operable by an operator to generate brake signals and including an emergency output port which provides an operator emergency pneumatic signal on the emergency output port when the brake controller is in an emergency position;
    a brake valve responsive to brake signals from the brake controller for generating brake signals on a brake pipe;
    a brake pipe vent valve including
        a housing having brake pipe, emergency input and exhaust ports,
        a first valve that connects the brake pipe port to the exhaust port and opens in response to a greater pressure in a first volume than pressure in a second volume connected to the brake pipe port, the first and second volumes being connected by a choke and
        a second valve that connects the brake pipe port to the exhaust port and opens in response to a smaller pressure in a third volume connected to the emergency input port than pressure in a fourth volume connected to the brake pipe port; and
    the emergency output port on the brake controller being fluidly connected to the emergency input port of the brake pipe vent valve;
    wherein the first valve opens in response to the second valve being open and also in response to an emergency pressure in the brake pipe; and the second valve opens only in response to the operator emergency pneumatic signal on the emergency input port.

3. A locomotive brake system comprising:
    a brake controller operable by an operator to generate brake signals and including an emergency output port which provides an operator emergency pneumatic signal on the emergency output port when the brake controller is in an emergency position;
    a brake valve responsive to brake signals from the brake controller for generating brake signals on a brake pipe;
    a brake pipe vent valve including
        a housing having brake pipe, emergency input and exhaust ports,
        a first valve that connects the brake pipe port to the exhaust port and opens in response to an emergency signal on the brake pipe port, and
        a second valve that connects the brake pipe port to the exhaust port and opens in response to an operator emergency signal on the emergency input port; and
    the emergency output port being fluidly connected to the emergency input port and the brake pipe port being fluidly connected to the brake pipe;
    wherein the first valve opens in response to the second valve being open and also in response to an emergency pressure in the brake pipe.

4. A locomotive brake system comprising:
    a brake controller operable by an operator to generate brake signals and including an emergency output port which provides an operator emergency pneumatic signal on the emergency output port when the brake controller is in an emergency position;
    a brake valve responsive to brake signals from the brake controller for generating brake signals on a brake pipe;
    a brake pipe vent valve including
        a housing having brake pipe, emergency input and exhaust ports,
        a first valve that connects the brake pipe port to the exhaust port and opens in response to an emergency signal on the brake pipe port, and
        a second valve that connects the brake pipe port to the exhaust port and opens in response to an operator emergency signal on the emergency input port; and
    the emergency output port being fluidly connected to the emergency input port and the brake pipe port being fluidly connected to the brake pipe;
    wherein the first valve opens in response to the second valve being open and also in response to an emergency pressure in the brake pipe; and the second valve opens only in response to the operator emergency pneumatic signal on the emergency input port.

5. A brake pipe vent valve for a locomotive, the valve comprising:
    a housing having brake pipe, emergency input and exhaust ports;
    a first valve that connects the brake pipe port to the exhaust port and opens in response to an emergency signal on the brake pipe port; and
    a second valve that connects the brake pipe port to the exhaust port and opens in response to an operator emergency signal on the emergency input port;
    wherein the brake pipe port is connected to the brake pipe and the emergency input port is connected to an emergency output port of a brake controller;
    wherein the first valve opens in response to the second valve being open and also in response to an emergency pressure in the brake pipe.

6. A brake pipe vent valve for a locomotive, the valve comprising:
    a housing having brake pipe, emergency input and exhaust ports;
    a first valve that connects the brake pipe port to the exhaust port and opens in response to an emergency signal on the brake pipe port; and
    a second valve that connects the brake pipe port to the exhaust port and opens in response to an operator emergency signal on the emergency input port;

wherein the brake pipe port is connected to the brake pipe and the emergency input port is connected to an emergency output port of a brake controller;

wherein the first valve opens in response to the second valve being open and also in response to an emergency pressure in the brake pipe; and the second valve opens only in response to the operator emergency pneumatic signal on the emergency input port.

\* \* \* \* \*